United States Patent [19]

Viertel et al.

[11] Patent Number: 5,601,766
[45] Date of Patent: Feb. 11, 1997

[54] METHOD OF MAKING A SUN VISOR FOR MOTOR VEHICLES

[75] Inventors: Lothar Viertel, Altforweiler, Germany; Patrick Welter, La Chambre, France

[73] Assignee: Gebr. Happich GmbH, Germany

[21] Appl. No.: 437,363

[22] Filed: May 9, 1995

Related U.S. Application Data

[62] Division of Ser. No. 335,984, Nov. 8, 1994, Pat. No. 5,477,429.

[30] Foreign Application Priority Data

Nov. 8, 1993 [DE] Germany .............. 43 38 019.0

[51] Int. Cl.⁶ .................................. B29C 44/06
[52] U.S. Cl. .......... 264/45.4; 264/245; 264/296; 264/321; 156/298
[58] Field of Search .............. 264/245, 45.1, 264/45.4, 296, 321; 156/298

[56] References Cited

U.S. PATENT DOCUMENTS

| | | | |
|---|---|---|---|
| 4,227,241 | 10/1980 | Marcus | 362/61 |
| 4,353,592 | 10/1982 | Cziptschirsch | 362/135 |
| 4,584,230 | 4/1986 | Saegusa | 264/45.1 |
| 5,141,578 | 8/1992 | Yang | 264/45.1 |
| 5,160,203 | 11/1992 | Viertel et al. | 362/141 |
| 5,184,888 | 2/1993 | Sakuma et al. | 362/83.1 |
| 5,203,623 | 4/1993 | Viertel et al. | 362/135 |
| 5,205,635 | 4/1993 | Van Order et al. | 362/83.1 |
| 5,252,270 | 10/1993 | Haardt et al. | 264/45.4 |
| 5,318,645 | 6/1994 | Yang | 264/245 |
| 5,466,405 | 11/1995 | Viertel et al. | 264/45.4 |

FOREIGN PATENT DOCUMENTS

| | | |
|---|---|---|
| 0530740 | 3/1993 | European Pat. Off. . |
| 4023243 | 11/1991 | Germany . |

*Primary Examiner*—Allan R. Kuhns
*Attorney, Agent, or Firm*—Ostrolenk, Faber, Gerb & Soffen, LLP

[57] ABSTRACT

A sun visor has a generally board shaped body of dark colored polypropylene particle foam with a depression in a main surface thereof. A shaped light colored body is inserted into the depression and is pressed against the bottom of the depression through simultaneous application of heat and pressure, for compacting and reshaping the shaped body to form a reflector. A mirror assembly is disposed over the reflector, and an illuminating device may be disposed there. Fastening pins and openings on the reflector in the mirror assembly and the illuminating device hold them together.

15 Claims, 3 Drawing Sheets

METHOD OF MAKING A SUN VISOR FOR MOTOR VEHICLES

This is a division of application Ser. No. 08/335,984, filed Nov. 8, 1994, now U.S. Pat. No. 5,477,429.

BACKGROUND OF THE INVENTION

The present invention relates to a sun visor for motor vehicles having a sun visor body of a dark colored, such as black, polypropylene particle foam. The body is developed as an approximately rectangular board. There is a depression in the main surface of the sun visor body to receive a reflector with a mirror assembly arranged above it, together with an illuminating device. The invention furthermore refers to a method of manufacturing such a sun visor.

Sun visors for motor vehicles having a sun visor body of dark colored polypropylene foam have been in use for a long time. These known sun visors also include ones which are equipped with a mirror structural unit and an electric illuminating device. European Patent 0 530 740, for example, describes a sun visor that can at least extensively consist of recyclable plastic, polypropylene, for example. It can also have a mirror inserted in a recess and the mirror can be associated with a lamp. The mirror can be removed entirely to allow the plastic to be recycled. This sun visor is in two halves made of expanded plastic, preferably polypropylene. The wrap and inserted stiffener (FIG. 8 in particular) can be of recyclable plastic. Another design with a mirror subassembly and a lamp is known from German Publication 4,023,243 C1, for example, which corresponds to U.S. Pat. No. 5,160,203. These known sun visors generally have the disadvantage that they are formed of a large number of individual parts, which makes their manufacture difficult and expensive.

SUMMARY OF THE INVENTION

The object of the present invention is to simplify a sun visor of the aforementioned type and reduce its cost, and to do the same with its method of manufacture.

According to the invention, the reflector is formed of a thermally compacted light colored, such as white, polypropylene particle foam body. That is combined with pressing the sun visor body within its depression. By directly attaching the reflector to the sun visor body by pressing the reflector into its position, a trough in the sun visor body, which was provided with a traditional reflector developed as a plastic injection molding or a sheet metal body, is no longer considered necessary. Since both the sun visor and the reflector are comprised of polypropylene, there should be no recycling problems. The light colored, preferably white, reflector assures optimal luminous efficiency, while the dark colored, such as black, sun visor body prevents the emergence of light at the rear of the sun visor.

In one embodiment of the invention, the reflector is pressed together with the sun visor body and welded to it within the depression in order to create an undetachable attachment between them.

In another embodiment of the invention, the reflector has pins or domes developed on its front side to hold a circuit board which is provided with corresponding openings and the reflector is provided with illuminating device parts, such as contact strips, micro-switches, and tubular bulbs. In this way, essential elements of the illuminating device can be applied rapidly and in simple manner directly to the reflector.

Furthermore, the reflector is developed with openings for the passage of fastening pins which are seated on the mirror assembly and engage into the sun visor body. The mirror assembly, which grips over the reflector and the circuit board, has a frame which rests on the edge of the depression. The frame supports a mirror, a light window, and possibly a cover flap for covering the mirror. It is advantageous for the fastenings pins which are part of the mirror assembly to be welded to the sun visor body.

In the method of the invention, polypropylene particles of dark color are introduced into a foam mold and are shaped into a sun visor body which is developed with a depression in its main surface. Light colored polypropylene particles are introduced into a second foam mold and are there shaped into a molded body which fits into the depression in the sun visor body. The light colored molded body is inserted into the depression in the sun visor body, and the light colored molding is pressed by the simultaneous application of heat and pressure against the bottom of the depression to be thereby compacted and shaped into a reflector. In this connection, the light colored molding is preferably compacted and shaped by a heatable stamping tool or stamp.

In a further development of the method of the invention, the sun visor body is also compacted and shaped, at least in some regions thereof, by the simultaneous application of heat and pressure. This develops a step shaped shouldering for the form locked reception of the frame of the mirror assembly, for instance, in the region of the edge of the depression in the sun visor body.

Finally, in accordance with another further feature of the invention, the surface layer of the sunvisor body can be plasticized and stamped. In this way, wrapping of the sun visor body with a layer of wrapping material can be avoided.

Other features and advantages of the present invention will become apparent from the following description of the invention which refers to the accompanying drawings.

BRIEF DESCRIPTION OF THE DRAWINGS

FIG. 6 is a section along the line D—D of FIG. 4.

DESCRIPTION OF A PREFERRED EMBODIMENT

Figure 1:
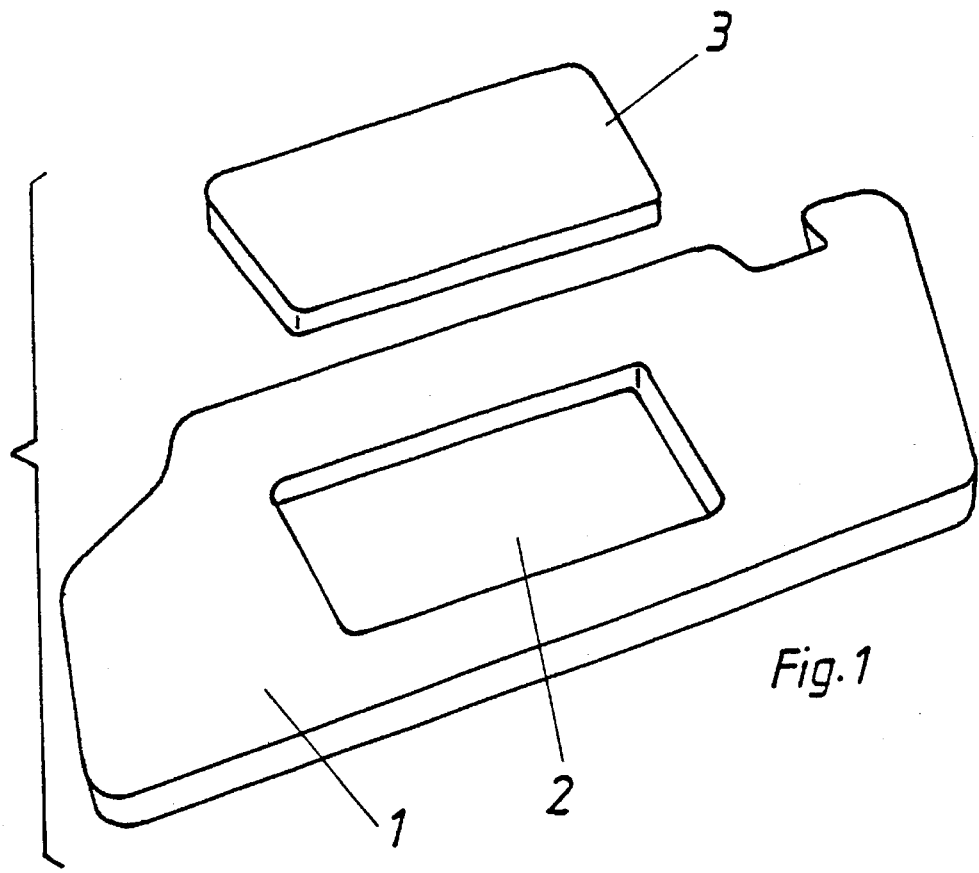
FIG. 1 is a perspective exploded view of a sun visor body along a reflector blank.
Figure 2:
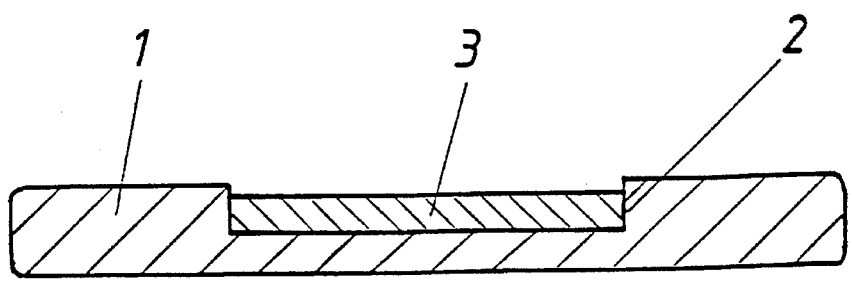
FIG. 2 is a cross-sectional view of the sun visor body of FIG. 1 with the reflector blank inserted into the depression.

A sun visor body 1 is formed of a black color polypropylene particle foam. It has a depression 2 in one of its main surfaces. A shaped body 3 formed of a white polypropylene particle foam and the body having the configuration shown in FIGS. 1 and 2 is first inserted into the depression 2. The sun visor body 1 and the shaped body 3 are each produced by introducing a filling of polypropylene particles, black for the sun visor body 1, white for the shaped body 3, into a respective cavity of a mold, not shown, and heating the particles so that they soften, expand and weld together by introducing steam or hot air into the corresponding mold.

Figure 3:
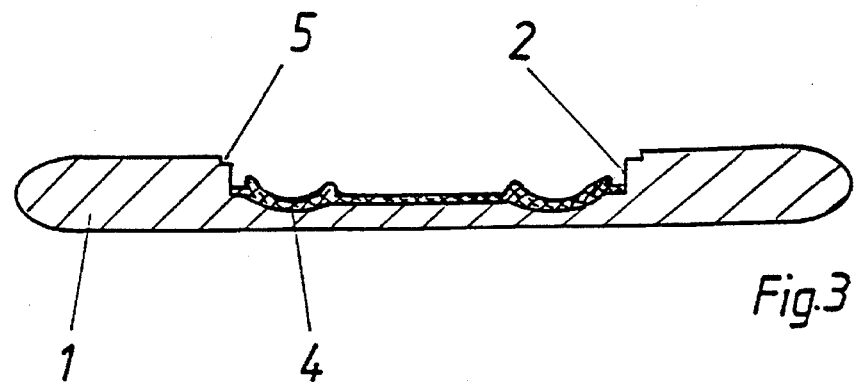
FIG. 3 is a cross-sectional view of the sun visor body after the thermal compacting of the sun visor body and the reflector.
Figure 4:
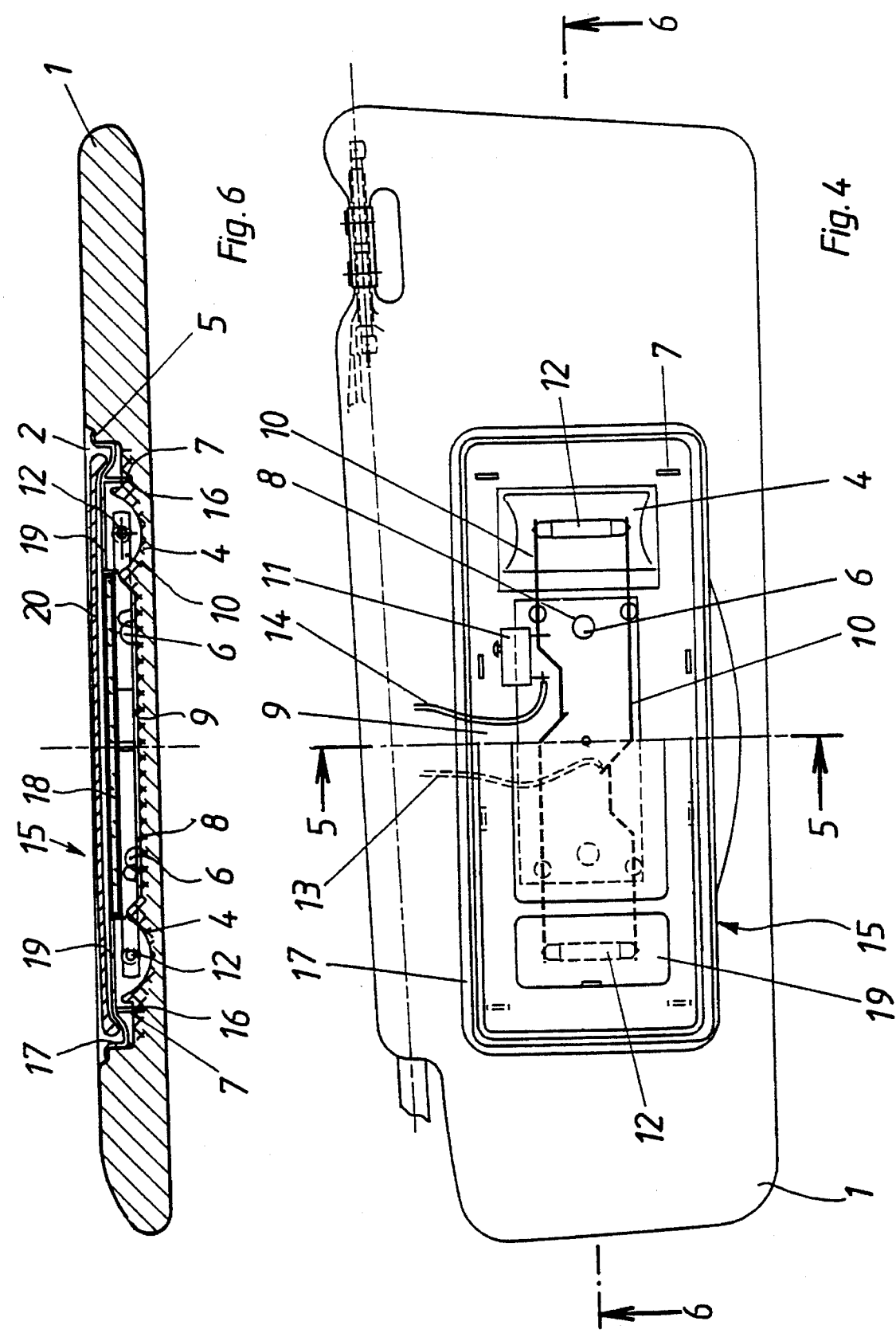
FIG. 4 is a top of the sun visor body with illuminating device.

The shaped body 3 is inserted into the depression 2 in the sun visor body 1. There the body is pressed against the bottom of the depression 2 along with the simultaneous application of heat and pressure, thereby compacting it and reshaping it into a reflector 4, as shown in FIGS. 3 and 6. The compacting and reshaping can be effected rapidly and in a simple manner by means of a heatable stamping tool (not shown). The thermal compacting process forms a closed undetachable unit.

It is also possible to insert the shaped body 3 into a mold, compact and reshape it thermally, and only later press it into the depression 2 in the sun-visor body 1. In this case, welding can also be effected between the sun visor body 1 and the reflector 4, for instance by reflector welding.

Figure 5:
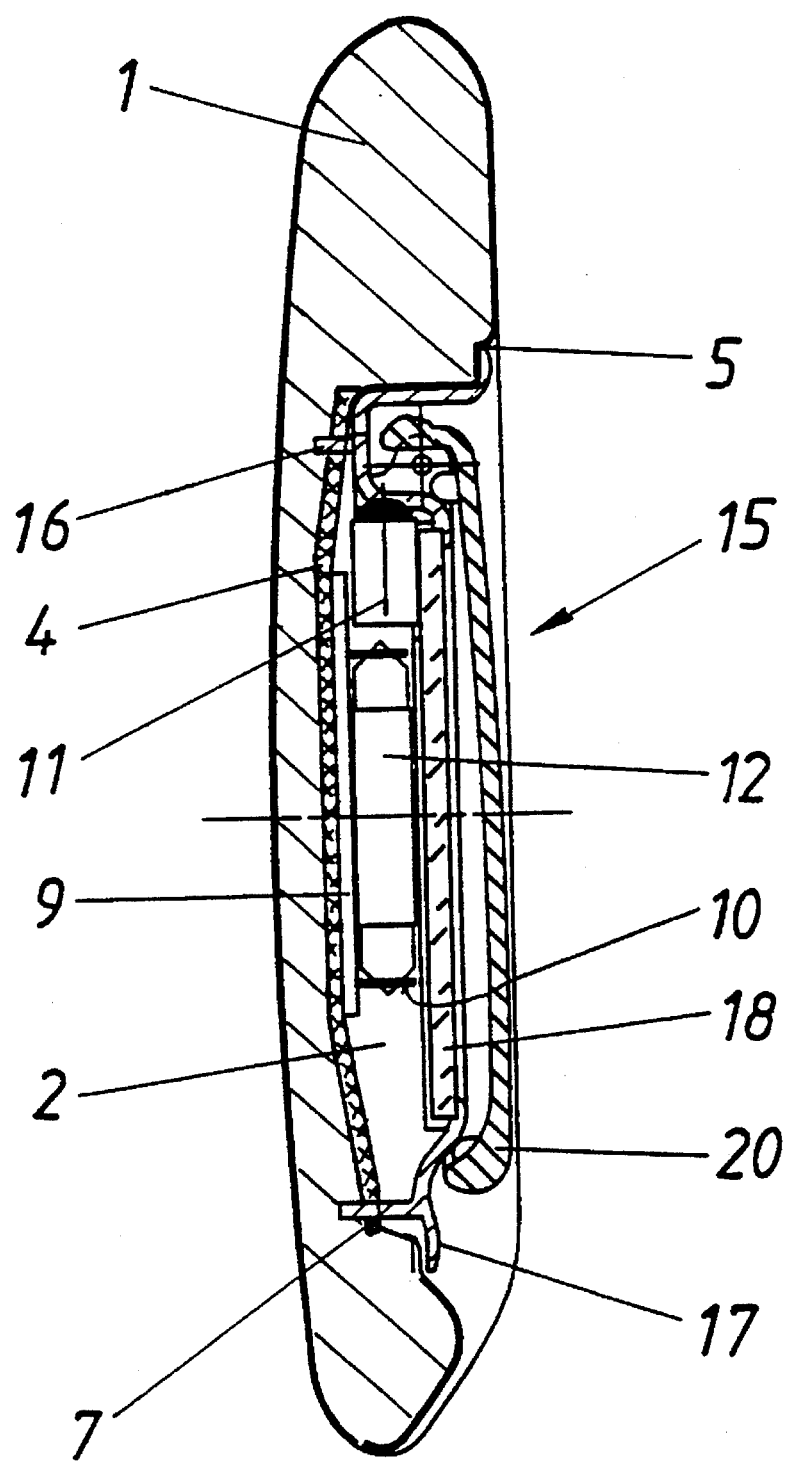
FIG. 5 is a section along the line A—A of FIG. 4.

The sun visor body 1 can also undergo thermal compacting and reshaping. In that case, for instance, a step wise shouldering 5 can be formed at the region of the edge of the depression 2. This enables the form locked reception of the frame of the mirror assembly as in FIGS. 5 and 6.

It is also possible to plasticize the sun visor body 1 on the surface layer which is then stamped. This produces a surface structure of any desired shape, and one can do without providing a separate covering of the sun visor body 1 with a wrapping material.

Upon the thermal compacting and reshaping of the shaped body 3, it is simultaneously provided with pins or domes 6 that are formed thereon and with slot openings 7. The domes 6 hold a circuit board 9 which is provided with corresponding openings 8 over the domes. The board carries illuminating device elements, their contact strips 10, microswitch 11 and tubular bulbs 12. Electric wires 13, 14 are connected to the electric contact elements 10, 11 to supply the electric current in a known manner from the electrical system of the vehicle.

The slot openings 7 formed in the reflector 4 permit the passage of fastening pins 16 which are seated on the mirror assembly 15 and which engage into the sun visor body 1 and are welded there, primarily by reflection welding. The mirror assembly 15 has a frame 17 which rests on the edge or on the step wise shouldering 5 of the depression 2. The frame bears a mirror 18, a light window 19, and a cover flap 20. Since the mirror assembly 15 can be removed only by destroying it, the light windows are hinged on the mirror assembly 15 so as to permit replacement of the tubular bulbs.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A method of manufacturing a sun visor comprising
    introducing a first type of polypropylene particles into a first foam mold and there molding the first polypropylene particles into a sun visor body having a main surface with a depression therein;
    introducing a second type of polypropylene particles into a second foam mold and there molding the second polypropylene particles into a shaped body which is shaped to fit into the depression in the surface of the sun visor body;
    introducing the shaped body into the depression of the sun visor body and pressing the shaped body against the bottom of the depression in the sun visor body to form a reflector within the depression in the sun visor body.

2. The method of claim 1, wherein the first polypropylene particles are dark colored and the second polypropylene particles are light colored.

3. The method of claim 1, wherein the shaped body is compacted and reshaped using a heatable shaping tool.

4. The method of claim 3, further comprising compacting and reshaping the sun visor body at at least some regions thereof by simultaneously applying heat and pressure to the sun visor body.

5. The method of claim 1, further comprising compacting and reshaping the sun visor body at least some regions thereof by simultaneously applying heat and pressure to the sun visor body.

6. The method of claim 1, further comprising plasticizing and stamping the surface layer of the sun visor body.

7. The method of claim 1, further comprising the step of simultaneously applying heat and pressure to compact and reshape said shaped body, simultaneously with said step of pressing the shaped body against the bottom of the depression in the sun visor body.

8. The method of claim 7, where the shaped body is compacted and reshaped using a heatable shaping tool.

9. The method of claim 7, wherein said thermal compacting and reshaping of the shaped body provides shapes for holding thereon a further component of said sun visor.

10. The method of claim 1, further comprising the step of simultaneously applying heat and pressure to compact and reshape said shaped body, prior to said step of pressing the shaped body against the bottom of the depression in the sun visor body.

11. The method of claim 10, further comprising the step of welding said shaped body to said sun visor body.

12. The method of claim 10, wherein said thermal compacting and reshaping of the shaped body provides shapes for holding thereon a further component of said sun visor.

13. The method of claim 1, wherein said thermal compacting and reshaping of the shaped body provides shapes for holding thereon a further component of said sun visor.

14. The method of claim 4, including the step of forming a stepwise shoulder at the edge of the depression in the sun visor body for form-locked reception of an additional component of said sun visor.

15. The method of claim 5, including the step of forming a stepwise shoulder at the edge of the depression in the sun visor body for form-locked reception of an additional component of said sun visor.

* * * * *